May 23, 1967  L. R. JACKSON  3,321,159
TECHNIQUES FOR INSULATING CRYOGENIC FUEL CONTAINERS
Filed May 21, 1965  3 Sheets-Sheet 1

INVENTOR
LIAM R. JACKSON

BY

ATTORNEYS

INVENTOR
LIAM R. JACKSON
ATTORNEYS

United States Patent Office 3,321,159
Patented May 23, 1967

3,321,159
TECHNIQUES FOR INSULATING CRYOGENIC
FUEL CONTAINERS
Liam R. Jackson, Newport News, Va., assignor to the
United States of America as represented by the Administrator of the National Aeronautics and Space
Administration
Filed May 21, 1965, Ser. No. 457,875
34 Claims. (Cl. 244—135)

The invention described herein may be manufactured and used by or for the Government of the United States of America for governmental purposes without the payment of any royalties thereon or therefor.

This invention relates to an arrangement for carrying cryogenic fuels in a hypersonic vehicle or the like, and more particularly to purge systems associated with cryogenic fuel storage and transportation.

It has been found that cryogenic fuels such as liquid hydrogen and liquid oxygen are very efficient propellants for various types of aerodynamic and space vehicles. Their application to propulsion systems, however, depend upon preventing excessive vaporization of the liquid propellants and prevention or rendering harmless the condensation of deleterious gases on cold surfaces surrounding the propellants. The deleterious gases usually include water vapor, oxygen and nitrogen all contained in the atmosphere. Water collected in structural joints expands as it freezes, and can result in rupture of the structure. Also, the additional weight of the frozen water and/or other gases may cause reductions in payload capability. Liquid air is initially oxygen-rich and it presents an explosion hazard. Liquefying nitrogen found in the atmosphere can cause excessive vaporization of the propellant.

Various arrangements have been suggested for overcoming the above mentioned difficulties of storing cryogenic fuel, such as liquid hydrogen for long periods of time in certain vertical takeoff vehicles or for carrying this type of fuel on horizontal takeoff vehicles that experience high heating rates for time periods as long as forty-five minutes.

One such method is to place insulation between two vacuum-leak-tight metal walls and evacuate this area by a pumping operation or by condensation of a trapped gas between the walls. The air trapped between the walls is normally purged with carbon dioxide gas, the carbon dioxide gas then being condensed to create a vacuum. It has been found to be a virtual impossibility to fabricate the vacuum-leak-free metal walls in thin gages. The walls must be very thin to maintain the structure within weight limitations. Upon aerodynamic heating, thermal stresses may cause bond failures and loss of the vacuum. The addition of plastic liners or sealers to these wall structures may have little value for reusable vehicles due to their high permeability to the gaseous phase of the cryogenic fuels. Should an internal liner or the metal wall leak liquid cryogenic, an explosive pressure surge can result from vaporization of the cryogenic as it contacts the hot outer surface. Leaks in the outer metal surface can result in explosive pressure surges and if this should not occur, the heat transfer results in a rapid vaporization of the cryogenic fuel within the tank.

Another prior art method utilized is to place insulation between the inner and outer sealed metal walls, these walls normally not being of the vacuum-leak-free type. The outer wall can be vented and the area between the walls purged with a noncondensable gas such as helium. It has been found that the helium gas in the insulation raises its thermal conductivity requiring a greater insulation weight for an optimum of cryogenic vaporization. Obviously, the thicker insulation walls reduces storage volume, increases weight, and relatively heavy storage containers for the helium are necessary when the helium is stored under ambient conditions.

Another technique suggested is the use of corkboard or foamed plastic, that can support one atmosphere or more crushing pressure, placed on the outside of the sealed metal wall. The hot-face of and joints in the insulation are sealed with a spray-on sealant or an epoxy cemented plastic film. A vented insulation can be used outside of this in conjunction with a vented wall. The voids in the corkboard or plastic foam are evacuated by condensation of trapped gases. The difficulty with this structure is that load bearing insulations are usually subject to thermal stresses that can cause cracks, and the temperature of the hot-face of the sealed insulation may exceed the usuable temperature of the sealants. If the hot-face of the load bearing insulation leaks, oxygen gas from the atmosphere can condense in the cork or foam resulting in an explosive material. Humidity can also be drawn into the outer vented insulation and cause structural failure due to freezing in the joints.

The invention here under consideration overcomes the difficulties inherent in the prior art arrangement discussed above. This is accomplished by providing a purge system which prevents the entrance of deleterious, condensable gases into the cold spaces around the cryogenic fuel tank, and also provides insulation. This is accomplished with little or no possibility of leakage of the cryogenic fuels from the storage area and yet provides a system which is well within the weight limitations of the hypersonic vehicle.

It is, therefore, an object of this invention to provide apparatus for carrying cryogenic fuels in a hypersonic vehicle which excludes the presence of deleterious, condensable gases from about the cryogenic storage area.

Still another object of the invention is to provide a method for preventing the entrance of condensable gases into cold spaces about the cryogenic propellants.

Another object of the invention is to provide an insulation for stored cryogenic fuels by depositing carbon dioxide frost on the tank and using a gaseous purge thereabout.

Yet another object of the invention is to provide an insulation arrangement for stored cryogenic fuels which does not require evacuation about the storage area nor the outer wall to be free of leaks.

An added object of the invention is to provide a porous type of insulation associated with the cryogenic storage tank which may be permeated with a carbon dioxide frost, the insulation preventing migration of the frost.

A further object of the invention is the method of placing gaseous carbon dioxide into the system initially at ambient temperature (or possibly hotter), and subsequently condensing the gas to form carbon dioxide frost by cryopumping upon filling the tank with cryogenic fuel.

An additional object of the invention is to provide an arrangement whereby carbon dioxide frost is deposited to form insulation, and operates as a purge gas and coolant upon sublimation due to aerodynamic heating.

Yet another object of the invention is to provide an insulation for cryogenic fuel storage wherein gaseous nitrogen is used as a purge in conjunction with deposited carbon dioxide frost.

Still another object of the invention is to provide an arrangement for carrying cryogenic fuels wherein helium purge gas is stored with the cryogenic fuel.

Another object of the invention is to provide a means for carrying cryogenic fuels in a hypersonic vehicle wherein the vehicle skin and structure are components of the insulation system.

Yet another object of the invention is to provide an insulation arrangement for protecting cryogenic fuels in a hypersonic vehicle which is light in weight, easy to manufacture and maintain, and is easy to work with when handling cryogenic fuels.

A further object of the invention is to provide an insulation technique for cryogenic fuels that can be used with single or multiple stage vehicles.

Still an added object of the invention is to provide a technique for insulating cryogenic fuels in a hypersonic vehicle wherein the weight of the insulation decreases as flight progresses.

Yet a further object of the invention is to provide an arrangement for carrying cryogenic fuels wherein the vehicle skin also functions as the fuel tank.

These and other objects and advantages of the invention will become more apparent upon reading the specification in conjunction with the accompanying drawings.

Generally, this invention relates to techniques for insulating cryogenic fuels carried by hypersonic vehicles. The skin of the vehicle is extremely thin; therefore, it is reinforced with Z-shaped stringers running in one direction and Y-frame stabilizing elements running in another. A fuel tank, which houses the cryogenic fuels, is supported within this structure. The walls of the tank are of a waffle plate construction and reinforced with T-shaped reinforcement ring members. The tank is covered with a porous insulation material which is bonded or mechanically attached thereto. This structural arrangement leaves spaces between the tank and the vehicle skin which may be purged. Means is provided for introducing carbon dioxide into these spaces. When the tank is filled with cryogenic fuel, the carbon dioxide solidifies and condenses in the form of carbon dioxide frost, permeating the insulation material. The frost is a highly efficient insulation material and upon aerodynamic heating sublimates giving off carbon dioxide gas which purges the area between the insulation and the vehicle skin preventing the entrance of atmospheric gases which might attempt to condense in the spaces between the tank and vehicle skin. The purge gas is continued until aerodynamic heating causes sublimation of the frost. The purge is effective as long as the pressure of the purge gas exceeds that of the external environment, since the purge gas will leak through the vented or unsealed vehicle skin preventing entrance of foreign gases.

Figure 1:
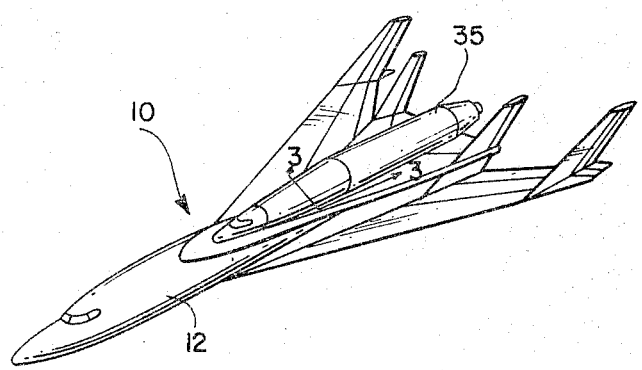
FIG. 1 is a perspective view of a multistage hypersonic vehicle of the type that would carry cryogenic fuels.

Referring now more specifically to the details of the invention, FIG. 1 shows a multistage hypersonic vehicle, designated generally by the reference numeral 10.

The vehicle 10 has a lower stage 12 of a configuration somewhat similar to the conventional aircraft in that it has a body or fuselage area, lifting surface area and control surface area. The upper stage 35 is the same general configuration and is mechanically connected to the lower stage. As is normal with staged vehicles, the upper stage may be separated from the lower stage to facilitate the mission requirement.

Considering now the lower stage 12, and more particularly the construction thereof wherein insulation is provided for cryogenic fuels carried thereby. The lower stage 12 has a skin 14 which may be constructed of a material such as René 41 or a cobalt-base alloy. In view of the weight limitations, the skin 14 is very thin (less than 0.010 inch thick) in certain applications. The skin is formed in sections and is relatively sealed. Stringers, of a Z-shape configuration, are fixed to the inside surface of the skin 14 by a conventional method such as welding. These stringers run parallel with the longitudinal axis of the lower stage and are located at spaced intervals thereabout. The stringers give the lower stage structural integrity along the longitudinal axis. The structure is further strengthened by the use of Y-shaped stabilizing members which are positioned in a plane perpendicular to the longitudinal axis at spaced intervals therealong. These members are slotted or have apertures at spaced intervals therealong to provide for dissipation of purge gas in a manner to be explained more fully hereinafter. Thus, a structure is provided which will support the fuel tank and its contents now to be described.

Figure 5:
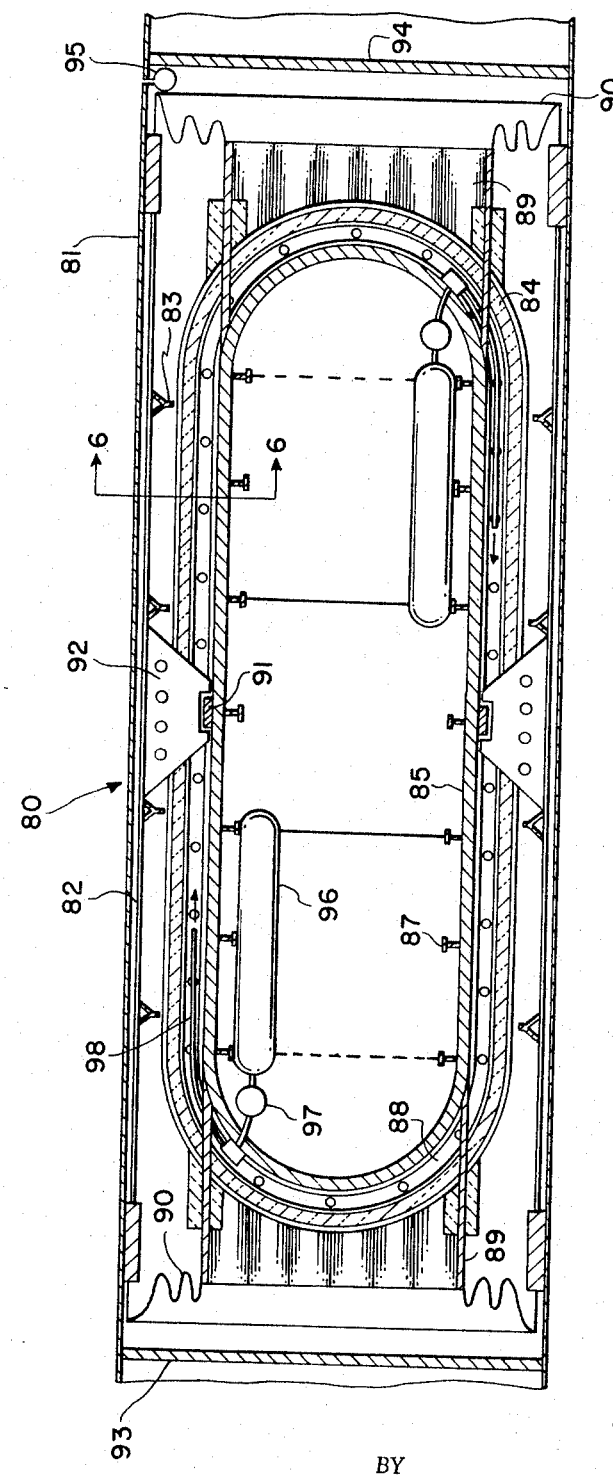
FIG. 5 is a cross-sectional view of an entire tank arrangement showing an arrangement for storing helium purge gas within the cryogenic fuel, and an arrangement for supporting the fuel tank with respect to the remainder of the vehicle.

The fuel tank 22 is constructed from a metal such as aluminum having a waffle plate configuration for strength purposes when the tank is unpressurized. The design of the tank is according to the best boiler plate practice for a pressure vessel. In addition, the interior of the tank is provided with a series of T-shaped reinforcement ribs in the form of rings which are spaced at intervals throughout the length thereof. The tank 22 is sufficiently thick at the edges of the plates to provide for a good weld at the seams enabling the tank to be constructed as a sealed, leak-tight structure. The tank may be supported within the skin structure by various techniques one of which is shown in FIG. 5 to be explained more fully hereinafter. Mechanism (not shown) of conventional design is associated with the tank to provide means for filling the tank with cryogenic fuel and thereafter sealing the tank.

The tank 22 is covered with insulation designated generally by the reference numeral 17. The insulation 17 may take various forms; however, it has been found that quartz fibrous sheets having a degree of porosity are particularly adapted for this purpose. These sheets are preferably covered with a glass and quartz cloth 19 secured thereto by stitching 20 with quartz thread to form panels. This arrangement facilitates bonding of the insulation material as panels to the tank since the quartz sheets are somewhat difficult to work with. Also, the thickness of the insulation may be readily varied by adding layers to the initial panels prior to bonding the panels to the tank, and insulation of different thermal conductivity may be utilized. Generally, the tank 22 is supported with respect to the skin 14 such that a gap remains between the insulation material and the Y-stabilization members 16.

Figure 2:
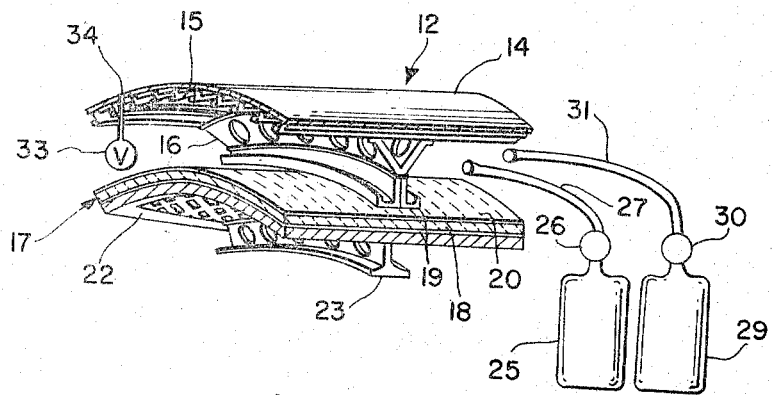
FIG. 2 shows a section in perspective of the lower stage of the hypersonic vehicle.

A carbon dioxide supply in the form of a pressure bottle 25 is shown diagrammatically adjacent the FIG. 2 structural configuration. Associated therewith is a regulator 26 and a conduit 27 for directing carbon dioxide gas to the area between the skin 14 and insulation 20. Depending upon the method utilized, some of the carbon dioxide supply 25 may be carried within the vehicle for the low aerodynamic heating phase of flight; and during ground-hold, $CO_2$ may be supplied from ground service equipment. The use of the carbon dioxide will be explained more fully in the operation of the invention. A helium supply 29, having a regulator 30 and conduit 31 of generally the same design as the carbon dioxide supply is also utilized and will be elaborated on in the description of the invention operation.

A pressure-relief valve 33, having a vent pipe 34, is associated with the structure to allow escape of the purge gas upon excessive pressure. The relief valve is located at some point between the tank and skin and is vented through the skin.

Figure 3:
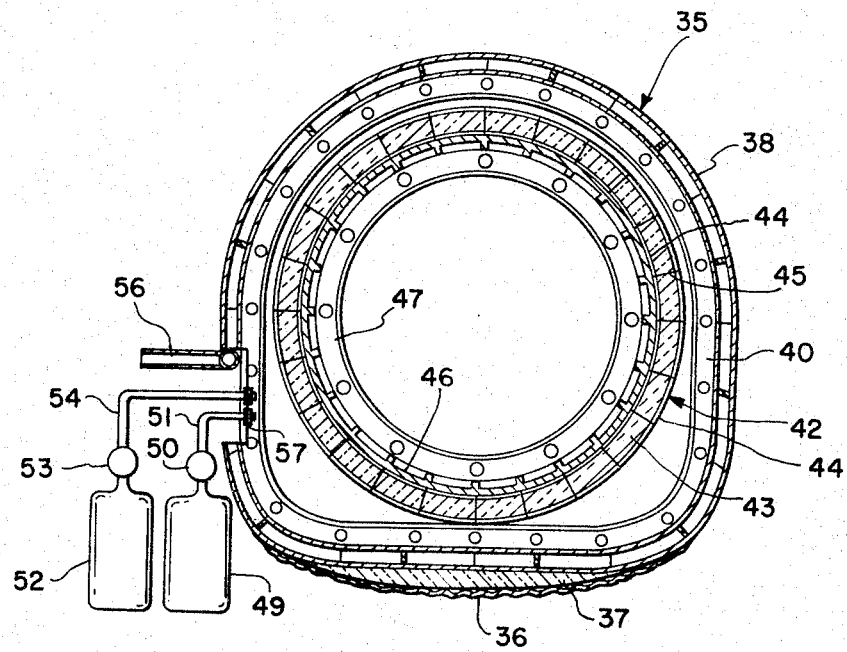
FIG. 3 is a cross-sectional view taken along the section lines 3—3 of FIG. 1 of the upper stage of the hypersonic vehicle.

Turning now to the upper stage 35 of the hypersonic vehicle, and more particularly to the structural configuration, which is best shown in FIG. 3. Looking at the structure in cross section, it has a generally D-shaped configuration, the flat portion of the D mating with the upper surface of the lower stage. The upper stage structure differs from the lower stage along the relatively flat surface wherein the skin shield 36 and insulation 37 cover the skin proper 38. The skin shield 36 is used to contain insulation 37 to limit the peak operating temperature of the skin proper 38 to the usable range of nickel or cobalt-base alloys. The aerodynamic surface temperature of the first stage would experience peak temperatures in the usable range of the super alloys; whereas, the aerodynamic surface temperature on lower surfaces of the second stage would exceed the usable range of super alloys. The skin shield 36 would be refurbishable shingles made from high temperature alloys, and the shingles would be attached through the insulation 37 to the skin proper 38.

The remainder of the upper stage structure is similar to that of the lower stage structure, except the skin 38 consists of honeycomb-core sandwich panels and Y-frame members 39. The tank 45 is constructed from metal having a waffle-plate configuration according to pressure vessel principles and is reinforced with T-shaped reinforcement ribs. Insulation 42, including quartz fiber sheets 43 covered with glass cloth 44 secured thereto by stitching 45, is mechanically attached to the tank and located between the tank and the skin.

A carbon dioxide supply 52, regulator 53 and conduit 54 are also supplied for the upper stage. In addition, a nitrogen supply 49 having a regulator 50 and conduit 51 are provided for the upper stage for purposes which will be explained more fully hereinafter. A door 56 coupling equipment 57 (of conventional design) are located in the skin 38 to provide means for connecting and disconnecting the carbon dioxide and nitrogen supplies.

Figure 4:
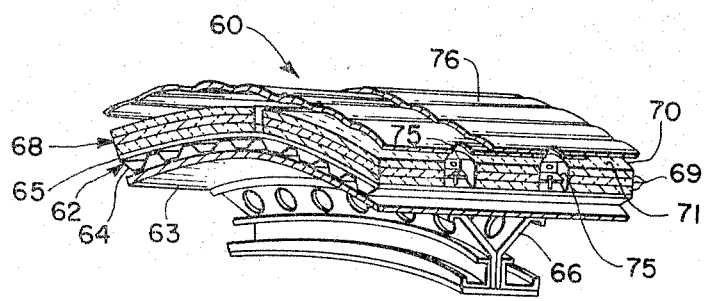
FIG. 4 shows a perspective of a vehicle wall in which the skin structure serves as the tank wall.

Another form of structure, designated generally by the reference numeral 60, is shown in FIG. 4. This arrangement is particularly adapted for use in a vehicle which has severe weight limitations or where the vehicle may be required to have fueled wings, since the structure skin also operates as the fuel tank.

The combined skin and tank 62, thus is constructed of a truss core sandwich having an inner layer 63, strut wafer 64 and outer layer 65. This structure must be sealed since it contains the cryogenic fuels. The tank and skin are reinforced by Y-shaped stabilizing members 66.

Since the tank and skin combination is a cold structure, this means that the tank is subjected to aerodynamic heating, the skin is covered with several layers of insulation 68. The insulation layers 68 are formed of porous quartz fibre sheets 69, covered with high temperature cloth 70, secured by stitching 71, as in previous embodiments.

Supports 75 are fixed to the outer layer 65 at intervals thereabout to receive shield 76. Apertures 72 are formed in the insulation 68 to allow the supports to project therethrough. The shield 76 is fixed to the supports 75 in a conventional manner such as by clips or other fastening technique. The shield 76 is formed in sections which merely overlap each other, thus, it can be stated that the shield is relatively sealed or vented.

Means for supplying carbon dioxide gas to the area between the tank and skin combination and the shield is like that shown in the FIG. 1 embodiment; therefore, this structure will not again be explained in detail.

Figure 6:
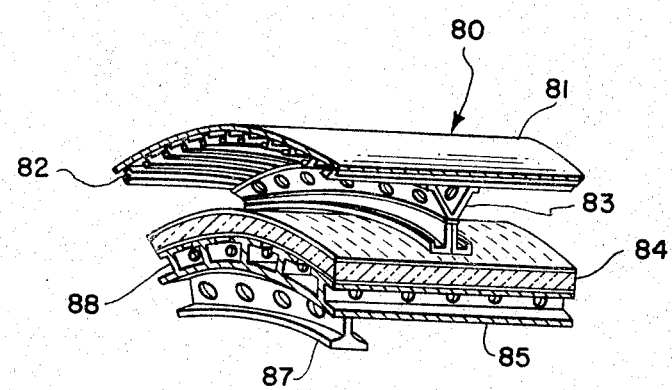
FIG. 6 is a cross-sectional view of a portion of the structure shown in FIG. 5, illustrated in perspective.

A modified form of the invention is shown in FIGS. 5 and 6, designated generally by the reference numeral 80, which may be utilized as a purge system and also as the means of insulation for either the upper or lower stages. In this configuration, the skin 81 is unsealed and made of material similar to that of the previous embodiment, and as in the previous embodiment, pressure relief valves are used to allow control of the purge gas pressure. The skin is reinforced with Z-shaped stringers 82 and Y-shaped stabilizing members 83 similar to the previous embodiments.

The tank 85 is constructed from a material having a waffle-plate design and both internal and external T-shaped reinforcement ribs 87 and 88, respectively. The insulation 84 is bonded or mechanically attached to the external reinforcement ribs as shown in FIG. 6. It is made from sheets of porous quartz fiberboard as in previous embodiments.

A support arrangement for the tank which may be utilized to support any of the previously described configurations, is also shown in FIG. 5. The support structure includes tank skirt extensions 89, extending from opposite ends of the tank. The skirt extensions are fixed to the end of the tank in a conventional manner such as by riveting to tank-wall extensions. The skirt extensions are of a generally cylindrical configuration when looking at the end thereof and may be corrugated for structural reasons. The skirt extensions are made of super-alloy, and insulated adjacent to the tank. Fixed to the other extremities of the skirt extensions 89 are concentrically convoluted support bellows 90. These bellows are in turn anchored to the skin structure 57. The bellows have a certain amount of resiliency allowing for some longitudinal and rotational movement of the tank ends within the skin. Thrust fittings 70 are fixed to the center of the tank and made with a slot formed in thrust brackets 71 secured to the skin 57. A certain amount of clearance is provided between the thrust fitting and bracket to allow limited radial movement of the tank 64. Bulkheads 93 and 94 are provided at either end of the skirt extensions to provide a chamber that can be pressurized other than to the extent leakage occurs through the relatively sealed skin and a pressure relief valve 95, vented through the skin. Generally, similar structure would be utilized with all of the embodiments of the invention.

Secured to the internal reinforcement ribs 87 are helium storage bottles 96. These bottles may be located on either end or both ends of the cryogenic fuel tank, and have regulators 97 and discharge tubing 98 to facilitate dispersion of the purge gas in the area between the tank and the insulation. The location of the helium storage tanks within the cryogenic fuel tank provides a means for economical storage of the helium gas for purge purposes, to be explained more fully hereinafter.

*Operation*

The method of providing an insulation for the first stage structure described above includes the step of initially purging the area between the skin 14 and the tank 22. This is accomplished with helium followed by carbon dioxide gas which displaces any air and humidity or other gases which may surround the tank, including any voids in the insulation 14. Since the skin 22 is relatively sealed or vented, the deleterious gases will be forced out through the skin. The tank 22 is then filled with a cryogenic fuel such as liquid hydrogen, which is at a temperature of approximately $-423°$ F. for cold tank solidifying carbon dioxide to form frost on the cold surfaces of the tank and throughout the insulation. The carbon dioxide pressure from the supply 25 is always less than that required to produce a liquid phase of the carbon dioxide. The formation of frost continues until the frost thickness is sufficient to establish a equilibrium hot-face temperature of the frost of $-110°$ F., after which no further solidification will occur. The hot-face of the frost being the area thereof closest to the skin 14. The carbon dioxide purge is continued until the hypersonic vehicle is ready for launch and the aerodynamic heating causes the carbon dioxide to sublime at a rate such that the resulting gas operates as a purge-gas supply. Since it is difficult to determine the rate at which the carbon dioxide will sublime due to aerodynamic heating, the pressure relief valve 33 is used to control the pressure between the tank and skin preventing possible rupture.

It should be noted that the frost impregnation of the insulation prevents migration of the frost thus providing a continuous insulation blanket for all areas of the tank. This becomes particularly important during the flight phase of the hypersonic vehicle since operation of the engines causes vibrations which can shake the frost to the bottom of the vehicle allowing heat to transfer to the upper surface of the tank resulting in boiling of the cryogenic fuel.

It has been found that the depositing of carbon dioxide frost requires a gas with the carbon dioxide which will not condense at the temperature of the cryogenic fuel in the tank. Thus, helium is used for liquid hydrogen tankage to purge the area between the tank and skin prior to admission of the carbon dioxide. The molecules of the noncondensable helium retard the flow of carbon dioxide toward the cold surface, and as the carbon dioxide molecules are cooled and change phase from the gas to a solid, they deposit as separate particles or frost. As the carbon dioxide gases are fed into the space around the tanks, the flow rate thereof is increased in direct proportion to the tank surface area being cooled, but the flow rate per-unit-area of cooled tank surface is maintained constant at about 0.3 lb./hr.-ft.$^2$ during tank cooldown. After tank cooldown the carbon dioxide flow rate is reduced to zero as equilibrium temperatures are approached. When equilibrium temperature is approached, no further frost will deposit and continued flow of the carbon dioxide gas will increase the pressure between the tank and the skin. A pressure relief valve may be set to open at a somewhat greater pressure than the original pressure, which will cause the carbon dioxide gas to purge the helium gas through the relief valve. The helium supply is stopped when the carbon dioxide flow is continued after equilibrium temperatures are approached. Thereafter, pressure control is maintained only with the carbon dioxide gas. Purging of the helium will also result through the vents or relatively sealed wall; however, use of the pressure relief valve accelerates the procedure. It may be necessary to heat the purge gases during cooldown to prevent freezing of water vapor on aerodynamic surfaces. Further heating of the carbon dioxide purge gas may be necessary upon removal of the helium to prevent the formation of a large layer of carbon dioxide ice on the hot-face of the carbon dioxide frost. The density at which carbon dioxide frost is deposited using this method is affected principally by the presence of the helium gas, by the partial pressure of the carbon dioxide and the helium surrounding the insulators and by the rate of heat removal from the hot-face of the frost deposit. Thus, by controlling these variables, the frost density can be controlled. The thermal conductivity is reduced as the frost density is reduced; therefore, the frost density should be as low as possible. However, the frost density must be sufficient to prevent the entrance of additional carbon dioxide gas into the frost after frost deposition and helium removal has occurred.

The method used with the structure shown in FIG. 4 is the same as described above except that the carbon dioxide and helium are injected between the tank and skin combination 62 and the shield 76.

The glass cloth 19 which covers the quartz fiber sheets 18 aids in the prevention of carbon dioxide frost migration. Use of the high temperature cloth also provides a means by enabling containment of several layers of different insulations for controlling the weight of the carbon dioxide frost deposited. If it is desired to collect more frost, two layers of insulation are provided around the tank, the outer insulation having a lower thermal conductivity than the inner insulation at a particular temperature. This causes an outward shift in the $-110°$ F. isotherm resulting in a thicker formation of frost.

The same effect can be accomplished by external stiffeners on the tank that partially penetrate the insulation. This increases the apparent conductivity of the inner insulation and provides greater cold surface area. Under some circumstances, it is desirable to collect less frost; in this case, the conductivity of the outer insulation is greater at a particular temperature than that of the inner insulation.

The method of insulating the upper stage cryogenic fuels differs somewhat from that of the lower stage. In view of the fact that it is necessary to utilize the skin shield 36 and insulation 37 for protecting the skin proper 38 from exceeding the desired operating temperature limit during reentry of the upper stage vehicle, nitrogen is utilized as a purge gas. The deposition of the carbon dioxide frost is somewhat similar to that described above, the carbon dioxide being supplied from the container 52 for purging. The carbon dioxide supply is continued as the tank 46 is filled with cryogenic fuel. After a specific amount of carbon dioxide frost is deposited on the tank and within the voids of the porous insulation 42, the area between the tank 46 and skin 38 is purged with nitrogen gas. The required amount of frost is less; however, because of the hot-face temperature of the frost may be as low as $-300°$ F. rather than $-110°$ F. which results with carbon dioxide purging. Generally, this type of insulation requires less weight depending on the average aerodynamic surface temperature during powered flight, and requires less time to deposit the carbon dioxide frost.

An alternate method of insulating cryogenic fuels utilizes the technique of purging the area between the tank 85 (FIG. 5 and FIG. 6) and skin 81. Although some work has been done previously on the idea of utilizing helium to purge this area in order to prevent deleterious gases from entering, the technique generally has been ruled out due to the weight penalty placed upon the vehicle for storage of the helium. Helium stored at ambient temperatures must be placed in extremely heavy containers, and many of these containers were necessary to complete a particular vehicle mission. Helium gas, however, may be greatly compressed at temperatures such as $-423°$ F., the temperature at which liquid hydrogen would be stored in the tank 85. Thus, by locating the helium storage bottles 96 within the tank 81, it is possible to store sufficient helium for purging within the weight limitations of the vehicle. The helium is released in the space between the tank and insulation material positioned thereabout in order to maintain the proper temperatures about the tank and to transpire through the insulation 61 thereby absorbing heat that would otherwise transfer through the insulation. Thus, the transportation of the helium purge gas through the insulation helps to prevent the cryogenic fuel from boiling. The helium also operates as a purge as it is discharged through the unsealed skin, thus preventing the entrance of deleterious gases into the areas between the tank and skin.

From the above description of the invention, it can be seen that novel arrangements are provided for insulating cryogenic fuels in a supersonic vehicle. These concepts provide for insulation of a hypersonic vehicle at weights of 6 lbs/ft.$^2$ or less, which is an acceptable weight for tankage structure of a hypersonic vehicle. The techniques described are also capable of use with a single stage or multistage vehicle. Utilization of the various purge gases eliminates the need for vacuum leak-free surfaces, only the tank surface is required to be sealed. Obviously, this eliminates the many inherent problems of attempting to seal an extremely thin metal surface which is subjected to high aerodynamic heating with the attendant thermal stresses. The carbon dioxide frost provides a heat sink, sublimation and transportation cooling in available space within the voids of the insulation at less weight than other types of insulation. The configuration shown in FIG. 4 being a cold structure, only one set of heat shields is required on all surfaces; whereas, in evacuated systems with cold structures, two sets of heat shields are required where the aerodynamic surface temperature exceeds the desired operating temperature of super alloys. Heat transfer during flight to the cryogenic fuel is reduced at heat shield supports that penetrate through the insulation since more frost will have been deposited on these supports than elsewhere, the frost thereon removing heat being transferred through the supports. The carbon dioxide does not liquefy and flow from desired locations. The carbon dioxide shrinks on freezing and leaves no residue on sublimation. It is also noncombustible, nontoxic and noncorrosive, thereby providing an extremely safe material to work with from the bodily injury standpoint as well as structural integrity of the hypersonic vehicle. The carbon dioxide is heavier than air, thus providing ease of purging and maintaining deleterious gases from critical areas. The frost is believed to have a lower thermal conductivity than many other gases and solid type of insulation, and also has a low density to help in solving the ever present weight problem. As the carbon dioxide frost sublimates, the weight of the hypersonic vehicle is reduced enabling the delivery of more payload. Obviously, this is not true of many other types of insulation which might be utilized. Both carbon dioxide and nitrogen used in the insulation technique are abundant and inexpensive. Proper use of the carbon dioxide, nitrogen and insulation provides many variables for controlling the weight and degree of insulation.

While a preferred embodiment of the invention and modification thereof have been described, it will be understood that other modifications and improvements may be made thereto. Such of these modifications and improvements as incorporate the principles of this invention are to be considered as included in the hereinafter appended claims unless these claims by their language expressly state otherwise.

What is claimed as new and desired to be secured by Letters Patent of the United States is:

1. An arrangement for carrying cryogenic fuels in a hypersonic vehicle or the like comprising: a vehicle; a sealed tank for containing cryogenic fuels supported within said vehicle; porous insulation means surrounding said tank; vehicle skin structure surrounding and being spaced from said tank; carbon dioxide frost impregnating said porous material and forming a layer of frost on said tank; and gaseous carbon dioxide occupying the space between said skin and tank at a pressure greater than the local external vehicle skin pressure.

2. An arrangement for carrying cryogenic fuels in a hypersonic vehicle or the like as in claim 1 wherein gaseous nitrogen occupies the space between the skin and the tank with said gaseous carbon dioxide.

3. An arrangement for carrying cryogenic fuels in a hypersonic vehicle or the like as in claim 1 wherein said porous insulation is quartz fiber sheets covered with glass cloth.

4. An arrangement for carrying cryogenic fuels in a hypersonic vehicle or the like as in claim 1 wherein the gaseous carbon dioxide occupying the space between said skin and tank is generated by subliming carbon dioxide frost due to aerodynamic heating of the vehicle.

5. An arrangement for carrying cryogenic fuels in a hypersonic vehicle or the like comprising: an aerodynamic vehicle; a fuel tank having a waffle plate configuration supported within said vehicle; T frames associated with the tank for stiffening the structure; fibrous quartz sheets covered with glass cloth secured to and covering said tank; vehicle skin surrounding said tank and spaced therefrom; said skin being reinforced with Z-stringers and Y-frames stabilizing said skin; means for supplying gaseous carbon dioxide between said insulation and said skin; means for condensing said carbon dioxide forming a frost impregnating said insulation and forming a layer of carbon dioxide frost over said tank; and means for purging the area between said tank and said vehicle skin with carbon dioxide at a pressure and rate to prevent cryogenic pumping.

6. An arrangement for carrying cryogenic fuels in a hypersonic vehicle or the like as in claim 5 wherein said means for purging the area between the tank and skin is subliming carbon dioxide frost generated as a result of aerodynamic heating of the vehicle.

7. An arrangement for carrying cryogenic fuels in a hypersonic vehicle or the like comprising: hypersonic vehicle means; tank means for carrying cryogenic fuels supported within said vehicle means; unsealed vehicle skin means spaced from and surrounding said tank means; and gaseous means for purging and cooling the area between said tank means and vehicle skin means at a pressure and rate to prevent condensation of the substance exterior of said vehicle skin between said tank means and vehicle skin means.

8. An arrangement for carrying cryogenic fuels in a hypersonic vehicle or the like as in claim 7 wherein the gaseous means for purging is carbon dioxide.

9. An arrangement for carrying cryogenic fuels in a hypersonic vehicle or the like as in claim 7 wherein the gaseous means for purging is nitrogen.

10. An arrangement for carrying cryogenic fuels in a hypersonic vehicle or the like as in claim 7 wherein the gaseous means for purging is helium.

11. An arrangement for carrying cryogenic fuels in a hypersonic vehicle or the like as in claim 7 wherein said tank means is covered with porous insulation means; and means for impregnating said porous insulation means with carbon dioxide frost.

12. An arrangement for carrying cryogenic fuels in a hypersonic vehicle or the like as in claim 7 wherein helium storage bottles are located within said tank means; gaseous helium in said tanks; and means for conveying said helium from said helium storage tanks to said area between said tank means and skin for cooling and purging.

13. An arrangement for carrying cryogenic fuels in a hypersonic vehicle or the like as in claim 7 wherein said area between said tank means and skin means is provided with pressure relief means.

14. An arrangement for carrying cryogenic fuels in a hypersonic vehicle or the like as in claim 7 wherein said tank means has external reinforcement ribs projecting therefrom; insulation means attached to said reinforcement ribs and surrounding said tank; unsealed vehicle skin means surrounding said tank means and being spaced therefrom; helium storage bottles located in said tank means; gaseous helium in said storage bottles; and means for conveying said helium from said storage bottles to the area between said tank means and insulation means for cooling and purging.

15. An arrangement for carrying cryogenic fuels in a hypersonic vehicle or the like comprising: a hypersonic vehicle having releasably connected lower and upper stages; tank means for carrying cryogenic fuels supported in each of said stages; unsealed vehicle skin means surrounding the respective tank means and being spaced therefrom; and separate gaseous means for purging and cooling the area between the respective tank means and vehicle skin means at a pressure and rate to prevent condensation of the substance exterior of said vehicle skin between said tank means and vehicle skin means.

16. An arrangement for carrying cryogenic fuels in a hypersonic vehicle or the like comprising: hypersonic vehicle means; a sealed structure means forming a combination tank and skin structure; porous insulation means covering said structure means; shield means covering said insulation means; means for supplying gaseous carbon dioxide between said structure means and shield; means for condensing said carbon dioxide forming a frost impregnating said insulation and forming a layer of carbon dioxide frost on said structure means; and means for purging the area between said structure means and shield means at a pressure and rate to prevent cryogenic pumping.

17. An arrangement for carrying cryogenic fuels in a hypersonic vehicle or the like as in claim 16 wherein said sealed structure means is a truss core sandwich structure.

18. The method of storing cryogenic fuels in a hypersonic vehicle having a fuel tank and skin structure spaced therefrom subjected to aerodynamic heating comprising the steps of: sealing the fuel tank; covering the fuel tank with an insulation material; impregnating the insulation material with carbon dioxide frost; and subliming the carbon dioxide frost upon aerodynamic heating to purge the area between the tank and skin to prevent condensation of foreign gases therein.

19. The method of storing cryogenic fuels in a hypersonic vehicle having a fuel tank and skin structure spaced therefrom subjected to aerodynamic heating comprising the steps of: sealing the cryogenic fuel tank; covering the cryogenic fuel tank with insulation material; filling the cryogenic fuel tank with cryogenic fuel; purging the area between the skin and tank with gaseous helium and carbon dioxide; condensing the carbon dioxide on the tank in the form of frost and impregnating the insulation material with carbon dioxide frost; and subliming the carbon dioxide frost upon aerodynamic heating to form a purge gas to prevent cryogenic pumping to the tank.

20. The method of storing cryogenic fuels in a hypersonic vehicle having a fuel tank and skin structure spaced therefrom subjected to aerodynamic heating comprising the steps of: sealing the cryogenic fuel tank; covering the cryogenic fuel tank with insulation material; filling the cryogenic fuel tank with cryogenic fuel; purging simultaneously the area between the skin and tank with helium and carbon dioxide gas; condensing the carbon dioxide on the tank in the form of frost and impregnating the insulation material with carbon dioxide frost; purging the helium from the area between the skin and tank with carbon dioxide gas; and subliming the carbon dioxide frost upon aerodynamic heating to form a purge gas to prevent cryogenic pumping to the tank.

21. The method of storing cryogenic fuels in a hypersonic vehicle having a fuel tank and skin structure spaced therefrom subjected to aerodynamic heating comprising the steps of: sealing the fuel tank; covering the fuel tank with an insulation material; impregnating the insulation material with carbon dioxide frost; purging the area between the tank and skin with dry nitrogen gas; and subliming the carbon dioxide frost upon aerodynamic heating to purge and prevent cryogenic pumping.

22. The method of storing cryogenic fuels in a hypersonic vehicle having a fuel tank and skin structure spaced therefrom subjected to aerodynamic heating comprising the steps of: sealing the fuel tank; covering the fuel tank with an insulation material; permeating the insulation with carbon dioxide frost; maintaining a purge gas in the area at a rate such that leakage is out through the skin to prevent cryogenic pumping to the tank.

23. The method of storing cryogenic fuels in a hypersonic vehicle having fuel tank and skin structure spaced therefrom subjected to aerodynamic heating comprising the steps of: sealing the fuel tank; filling the fuel tank with liquid hydrogen; storing helium in the liquid hydrogen; bleeding helium from the liquid hydrogen area to purge and cool the area between the tank and skin; and maintaining helium purge gas in the area at a rate and pressure such that leakage is out through the skin to prevent cryogenic pumping to the tank.

24. The method of storing cryogenic fuels in a hypersonic vehicle having a fuel tank and skin structure spaced therefrom subjected to aerodynamic heating comprising the steps of: sealing the fuel tank; covering the fuel tank with a porous insulation material; purging the area between the tank and skin with gaseous helium and carbon dioxide gas; filling the tank with a liquid cryogenic at a temperature of from −300° F. to −423° F.; maintaining the carbon dioxide purge pressure such that it solidifies due to cryogenic pumping from the cryogenic fuel in the tank; depositing carbon dioxide frost on the tank and impregnating the insulation material with carbon dioxide frost; depositing the carbon dioxide frost until it has a thickness providing a hot-face temperature of −110° F.; purging the gaseous helium from the area between the skin and tank with carbon dioxide; thereafter purging the area between the carbon dioxide frost and the skin with a gas until aerodynamic heating causes sublimation of the carbon dioxide frost to purge said area.

25. The method of storing cryogenic fuels in a hypersonic vehicle having a fuel tank and skin structure spaced therefrom subjected to aerodynamic heating as in claim 24 wherein the area between the carbon dioxide frost and skin is purged with carbon dioxide.

26. The method of storing cryogenic fuels in a hypersonic vehicle having a fuel tank and skin structure spaced therefrom subjected to aerodynamic heating as in claim 24 wherein the area between the carbon dioxide frost and skin is purged with nitrogen.

27. The method of storing cryogenic fuels in a hypersonic vehicle having a fuel tank and skin structure spaced therefrom subjected to aerodynamic heating as in claim 24 including the step of relieving excess gaseous pressure between the vehicle skin and fuel tank.

28. The method of storing cryogenic fuels in a hypersonic vehicle having a fuel tank and skin structure spaced therefrom subjected to aerodynamic heating as in claim 24 including the step of covering the insulation material with glass cloth to prevent migration of the frost.

29. The method of storing cryogenic fuels in a hypersonic vehicle having a fuel tank and skin structure spaced therefrom subjected to aerodynamic heating comprising the steps of: sealing the fuel tank; covering the fuel tank with layers of porous insulation; changing the thermal conductivity of one of said insulation layers; impregnating the insulation material with carbon dioxide frost; and subliming the carbon dioxide frost upon aerodynamic heating to purge the area between the tank and skin to prevent condensation of foreign gases in said area.

30. The method of storing cryogenic fuels in a hypersonic vehicle having a combined fuel tank and skin structure subjected to aerodynamic heating comprising the steps of: sealing the fuel tank; covering the fuel tank with a porous insulation; forming external stiffeners on the fuel tank partially penetrating the porous insulation; covering the insulation with a heat shield; impregnating the insulation material with carbon dioxide frost; and subliming the carbon dioxide frost upon aerodynamic heating to purge the area between the combination tank and skin and shield to prevent condensation of foreign gases in the area.

31. The method of storing cryogenic fuels in a hypersonic vehicle having a fuel tank and skin structure spaced therefrom subjected to aerodynamic heating comprising the steps of: sealing the fuel tank; covering the fuel tank with a porous insulation material; purging the area between the tank and skin with carbon dioxide; filling the tank with a liquid cryogenic at a temperature of from −300° F. to −423° F.; maintaining a carbon dioxide and nitrogen purge at a pressure such that the carbon dioxide solidifies due to heat transfer to the fuel tank causing carbon dioxide frost to impregnate the insulation material; depositing the carbon dioxide frost until it has a thicknesss providing a hot face temperature of −300° F.; and purging the area between the carbon dioxide frost and skin with nitrogen until aerodynamic heating causes sublimation of the frost for purging.

32. An arrangement for carrying cryogenic fuels in a hypersonic vehicle or the like as in claim 15 wherein the gaseous purge and cooling means for the lower stage is carbon dioxide and for the upper stage is nitrogen.

33. An arrangement for carrying cyrogenic fuels in a hypersonic vehicle or the like as in claim 15 wherein insulation means covers the respective tank means; means for depositing carbon dioxide frost on the respective tank means and permeating the insulation means; and said gaseous means for purging and cooling the areas between the respective tank means and skin means being carbon dioxide in the lower stage and nitrogen in the upper stage.

34. An arrangement for carrying cryogenic fuels in a hypersonic vehicle or the like as in claim 15 wherein insulation means covers the respective tank means; means for depositing carbon dioxide frost on the respective tank means and permeating the insulation means; skin insulation means covering said upper stage skin means and shield means covering said skin insulation means in an area subjected to aerodynamic heating; and said gaseous means for purging and cooling the areas between the respective tank means and skin means being carbon dioxide in the lower stage and nitrogen in the upper stage.

References Cited by the Examiner

UNITED STATES PATENTS

| | | | |
|---|---|---|---|
| 2,676,773 | 4/1954 | Sanz et al. | 244—135 |
| 2,810,265 | 10/1957 | Beckwith | 62—1 |
| 2,897,657 | 8/1959 | Ropp | 62—45 |
| 2,908,455 | 10/1959 | Hoadley | 244—117 |
| 2,922,291 | 1/1960 | Fox et al. | 244—117 |
| 2,959,023 | 11/1960 | Webster | 62—45 |
| 2,986,891 | 6/1961 | McMahon | 62—45 |
| 3,014,353 | 12/1961 | Scully et al. | 244—117 |
| 3,022,190 | 2/1962 | Feldman | 117—37 |
| 3,089,318 | 5/1963 | Hebeler | 244—117 |
| 3,103,885 | 9/1963 | McLauchlan | 244—117 X |
| 3,104,758 | 9/1963 | Allen et al. | 206—.6 |
| 3,122,883 | 3/1964 | Terner | 244—117 X |
| 3,138,009 | 6/1964 | McCreight | 244—117 X |
| 3,159,012 | 12/1964 | Brunner | 244—117 |
| 3,180,111 | 4/1965 | Rannenberg et al. | 244—117 X |
| 3,236,476 | 2/1966 | White | 244—1 |

MILTON BUCHLER, *Primary Examiner.*

B. BELKIN, *Assistant Examiner.*